(12) United States Patent
Ballegeer et al.

(10) Patent No.: US 10,306,834 B2
(45) Date of Patent: Jun. 4, 2019

(54) CHOPPER AND SPREADER FOR AN AGRICULTURAL HARVESTER

(71) Applicant: CNH Industrial America LLC, New Holland, PA (US)

(72) Inventors: Stefaan Ballegeer, Beernem (BE); Frank R. G. Duquesne, Zwevegem (BE); Nathan E. Isaac, Lancaster, PA (US); Joachim Meurisse, Izegem (BE); Mark D. Dilts, New Holland, PA (US); Frederik Baes, Reninge (BE)

(73) Assignee: CNH Industrial America LLC, New Holland, PA (US)

( * ) Notice: Subject to any disclaimer, the term of this patent is extended or adjusted under 35 U.S.C. 154(b) by 71 days.

(21) Appl. No.: 14/543,118

(22) Filed: Nov. 17, 2014

(65) Prior Publication Data

US 2016/0135377 A1    May 19, 2016

(51) Int. Cl.
*A01D 41/12*    (2006.01)
*A01F 12/40*    (2006.01)

(52) U.S. Cl.
CPC .......... *A01D 41/1243* (2013.01); *A01F 12/40* (2013.01)

(58) Field of Classification Search
CPC .......... A01F 17/02; A01F 12/40; A01F 12/44; A01F 29/12; A01D 41/12; A01D 41/1243; A01D 57/00
See application file for complete search history.

(56) References Cited

U.S. PATENT DOCUMENTS

| | | | | |
|---|---|---|---|---|
| 3,005,637 | A * | 10/1961 | Hetteen | A01F 12/40 241/101.2 |
| 4,020,995 | A * | 5/1977 | Purrer | A01F 29/14 241/101.2 |
| 5,833,533 | A * | 11/1998 | Roberg | A01F 12/40 460/112 |
| 6,247,296 | B1 * | 6/2001 | Becker | A01D 41/142 460/20 |
| 6,416,405 | B1 | 7/2002 | Niermann | |
| 6,572,035 | B1 | 6/2003 | Pfeiffer | |
| 6,685,558 | B2 | 2/2004 | Niermann et al. | |
| 6,719,627 | B2 | 4/2004 | Wolters et al. | |
| 6,863,605 | B2 * | 3/2005 | Gryspeerdt | A01F 12/40 460/111 |

(Continued)

FOREIGN PATENT DOCUMENTS

DE    4218235 A1    12/1993
EP    0631717 A1 *  1/1995    ......... A01D 41/1243

(Continued)

*Primary Examiner* — Robert E Pezzuto
*Assistant Examiner* — Adam J Behrens
(74) *Attorney, Agent, or Firm* — Patrick M. Sheldrake; Peter K. Zacharias

(57) ABSTRACT

An agricultural harvester includes a chassis, with a separating system and a residue handling system each carried by the chassis. The separating system receives a flow of crop material producing a chaff flow and a residue flow. The residue handling system receives the chaff flow and the residue flow from the separating system, and the residue handling system includes a residue chopper operationally positioned immediately above a residue spreader. The residue spreader is oriented to receive the chaff flow and the residue flow chopped by the residue chopper.

16 Claims, 13 Drawing Sheets

(56) References Cited

U.S. PATENT DOCUMENTS

| | | | |
|---|---|---|---|
| 6,881,145 B2 | 4/2005 | Holmen | |
| 7,485,035 B1* | 2/2009 | Yde | A01D 41/1243 460/111 |
| 7,510,472 B1* | 3/2009 | Farley | A01D 90/04 460/112 |
| 7,648,413 B2* | 1/2010 | Duquesne | A01D 41/127 460/112 |
| 7,717,779 B1* | 5/2010 | Weichholdt | A01D 41/1243 460/112 |
| 7,896,732 B2* | 3/2011 | Benes | A01D 41/1243 460/112 |
| 8,128,466 B2 | 3/2012 | Weichholdt et al. | |
| 8,221,203 B1* | 7/2012 | Flickinger | A01F 12/40 460/112 |
| 8,585,475 B2* | 11/2013 | Isaac | A01F 12/40 460/111 |
| 8,939,830 B2 | 1/2015 | Holmen | |
| 2004/0092298 A1* | 5/2004 | Holmen | A01D 41/1243 460/111 |
| 2008/0234020 A1* | 9/2008 | Isfort | A01D 75/187 460/112 |
| 2009/0253474 A1 | 10/2009 | Isaac | |
| 2012/0056024 A1* | 3/2012 | Isaac | A01F 12/40 241/25 |
| 2012/0270613 A1* | 10/2012 | Isaac | A01D 41/1243 460/111 |

FOREIGN PATENT DOCUMENTS

| | | | |
|---|---|---|---|
| EP | 631717 A1 | 1/1995 | |
| EP | 1897430 A2 | 3/2008 | |
| WO | 2014180911 A1 | 11/2014 | |

\* cited by examiner

CHOPPER AND SPREADER FOR AN AGRICULTURAL HARVESTER

BACKGROUND OF THE INVENTION

The present invention relates to agricultural harvesters, and, more specifically to a chopper and spreader configuration.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

The separating system directs the non-grain material toward a residue system that processes and/or spreads the residue upon the field.

The prior art traditional hood mount chopper is heavy and the mass is suspended a significant distance rearward from the steering (rear) axle of the combine. This increases the load on the rear axle when evaluating an overall vehicle weight/balance on 2 or more axles in order to meet on-road transportation requirements. Because of the substantial rearward placement of the chopper, assistive devices are often required to help transport the material from the discharge beater to the chopper. These devices may include a conveyor belt or additional beaters. A lighter weight solution is desirable.

What is needed in the art is a residue handling system that reduces or eliminates the need for flow assistive devices and reduces the overall weight of the harvester.

SUMMARY OF THE INVENTION

The present invention provides a close association of the chopper with the spreader, yet accommodates the flow of residue when in a windrow mode.

The invention in one form is directed to an agricultural harvester including a chassis, with a separating system and a residue handling system each carried by the chassis. The separating system produces a chaff flow and a residue flow. The residue handling system includes a residue chopper operationally positioned immediately above a residue spreader.

An advantage of the present invention is that the chopper, when in a chopper mode, directs the chopped residue directly into the spreader.

Another advantage is that when the residue handling system is in the windrow mode the flow of the residue is assisted by the chopper movement.

Yet another advantage is that the chopper may change speed and/or direction of rotation depending on whether the door is in the windrow mode or the chopping mode.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material that is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
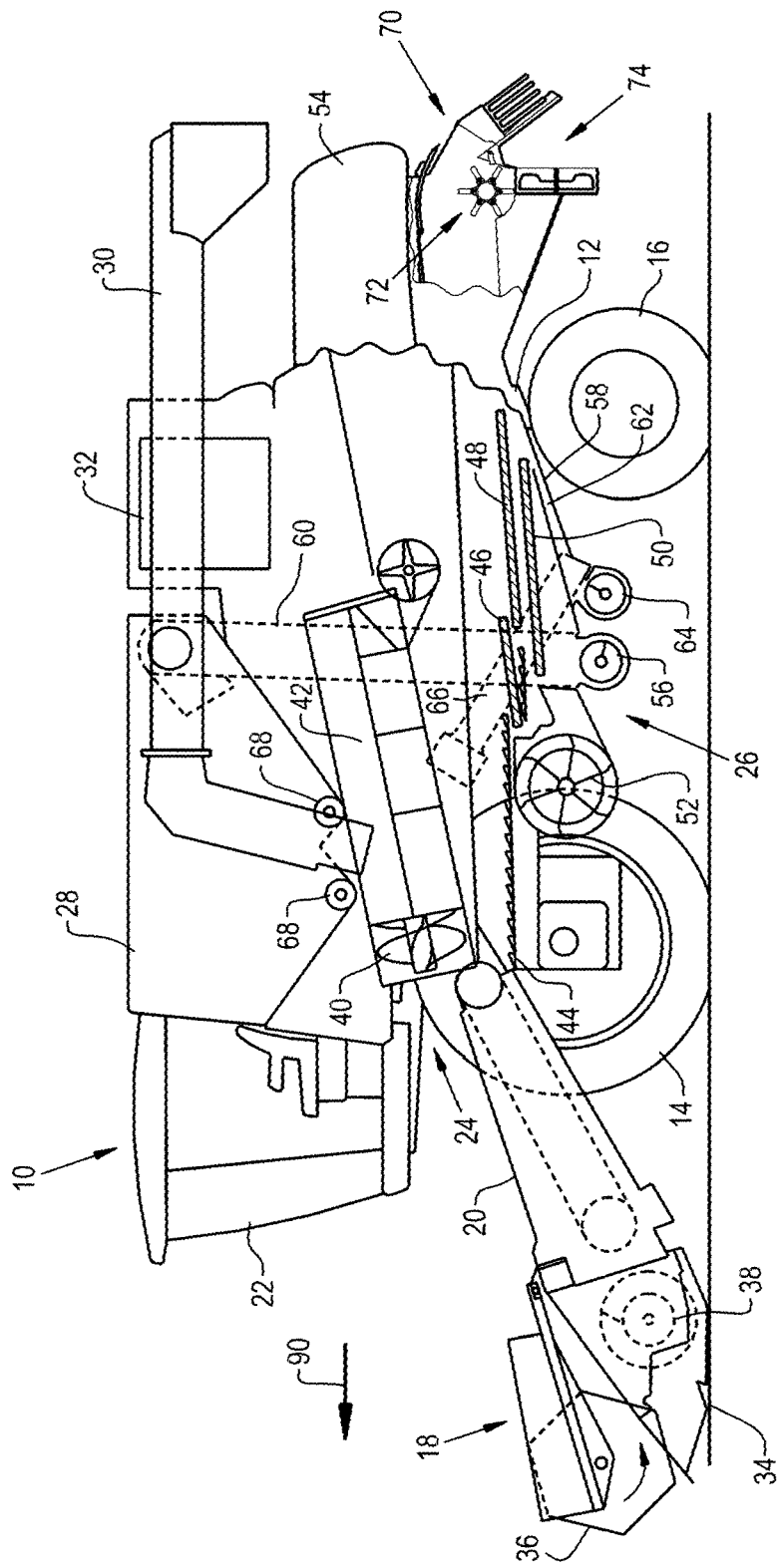
FIG. 1 is a side view of an embodiment of an agricultural harvester in the form of a combine illustrating the residue handling system of the present invention in a cutout view toward the rear of the harvester.
Figure 2:
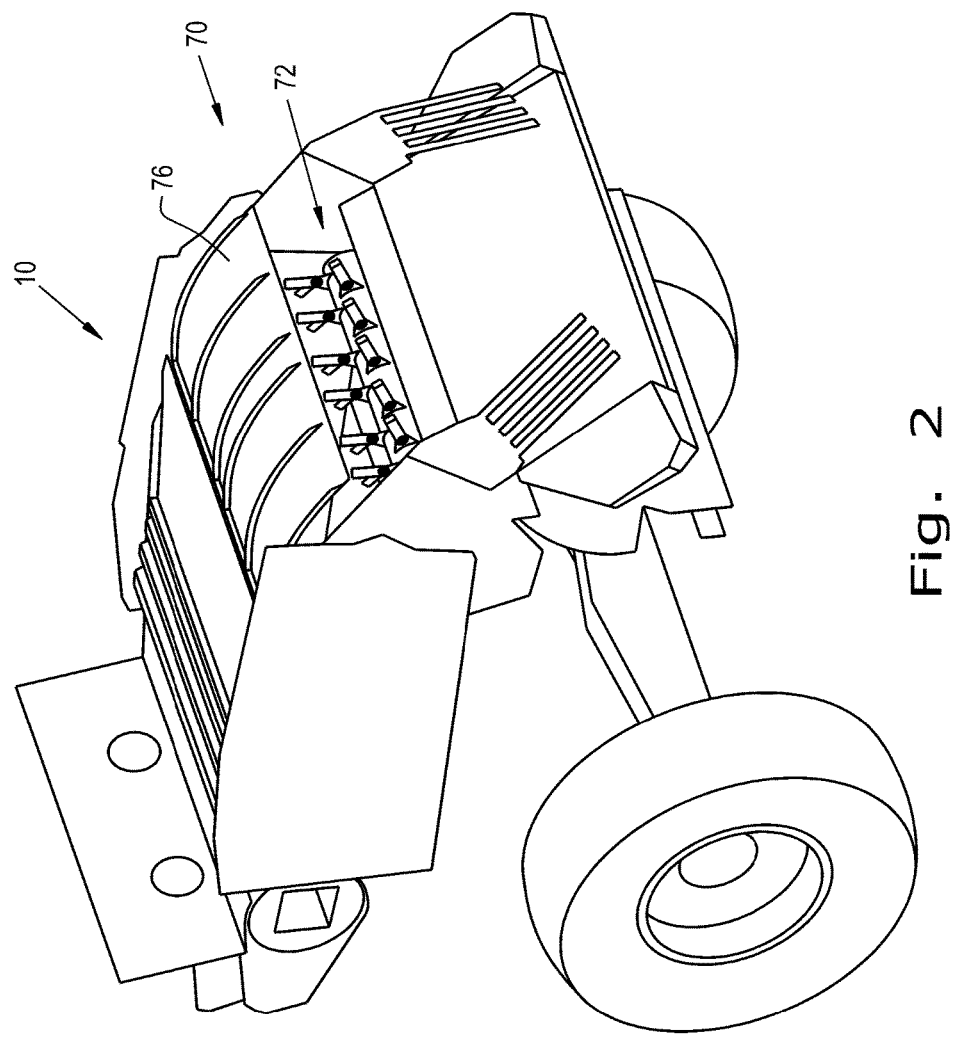
FIG. 2 is a rear perspective view of some of the components of the harvester of FIG. 1 showing further details of the present invention.
Figure 3:
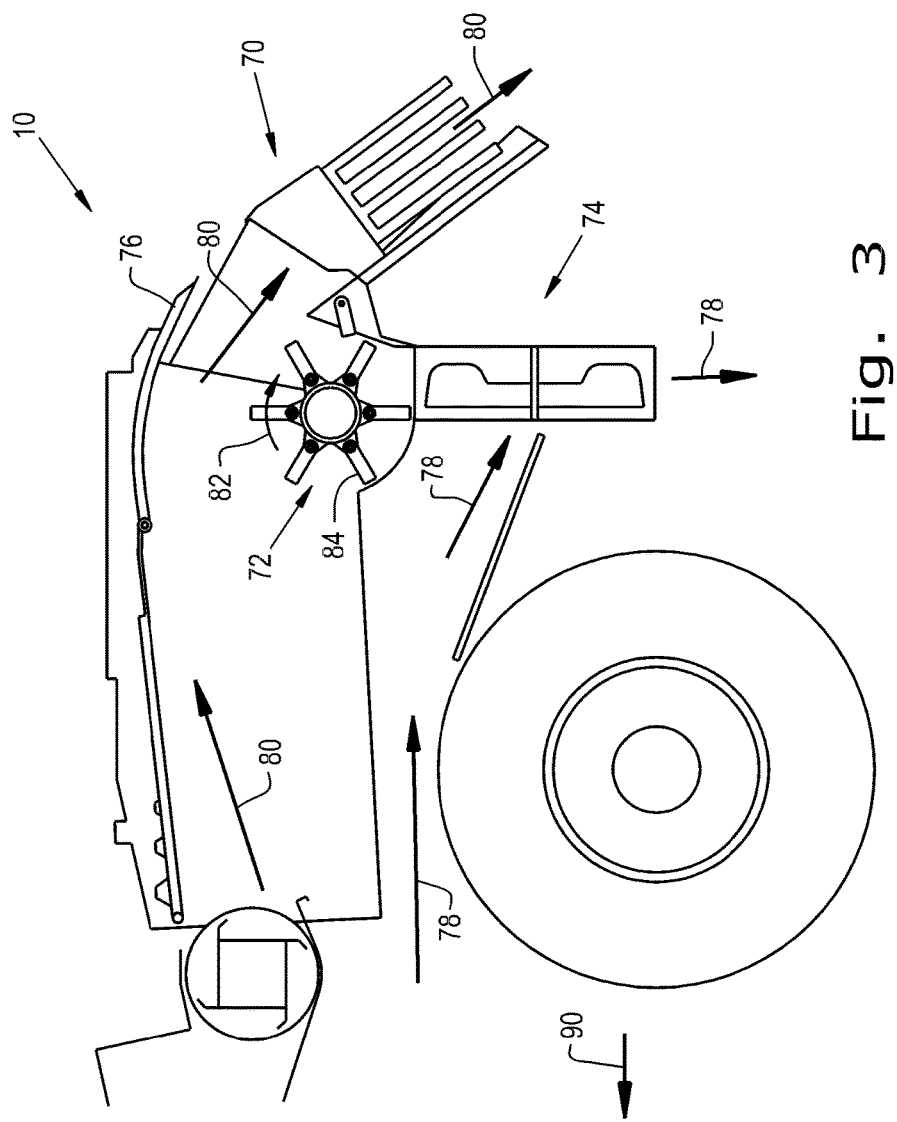
FIG. 3 is a side cutaway view of the residue handling system of FIGS. 1 and 2 in a windrow mode.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

The front wheels 14 are larger flotation type wheels, and rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half-tracks.

The header 18 is mounted to the front of the combine 10 and includes a cutter bar 34 for severing crops from a field during forward motion of combine 10. A rotatable reel 36 feeds the crop into the header 18, and a double auger 38 feeds the severed crop laterally inwardly from each side toward the feeder housing 20. The feeder housing 20 conveys the cut crop to threshing and the separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain that has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52, which provides an airflow through the sieves, to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of the lower sieve 50. The clean grain auger 56 receives clean grain from each sieve 48, 50 and from bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

Now, additionally referring to FIGS. 2-6, according to an aspect of the present invention, a residue handling system 70 is integrated in the rear of harvester 10. More specifically a straw hood 54 mounted residue chopper 72 is located above a vertically oriented straw and chaff spreader 74. The residue spreader 74 receives two streams of crop residue when in a chopping mode. One stream from the straw chopper 72 and a second stream from the cleaning system 26. The residue spreader 74 discharges the non-grain crop material or residue across the harvested width behind harvester 10. A mode selection door 76 is located above the residue chopper 72 with a transverse axis and pivots between two positions, a windrow mode and a chopping mode, such that the first stream 80 of crop is either diverted to the residue chopper 72 (chopping mode) or over the residue chopper 72 to form a windrow (windrow mode). The residue spreader 74 may pivot about a transverse axis between an operating position and a storage or service position. A windrow chute of known art is provided that may or may not be attached to the spreader 74 and rotates with the spreader 74.

The present invention includes some existing systems that are reorganized and provided with new capabilities. In contrast to the prior art, the hood mount chopper 72 is located inside the straw hood 54 and rotates in a clockwise direction when viewed from the left-hand side of the machine. The discharge from the chopper 72 is mostly downward into a vertically disposed spreader 74. The spreader 74 may be of known construction such as those used in the Case IH combine and this disclosure incorporates all of the known concepts of that assembly.

Further, the present inventive concept improves upon the traditional design because the chopper 72 is moved further forward, closer to the discharge beater so that the distance to propel crop is reduced, thereby eliminating the need for crop transport assistive devices.

Material discharged from the discharge beater passes to the windrow selection door 76 that may divert the crop residue to either 1) the chopper 72 for chopping, or 2) over the chopper 72 to form a windrow. When the door 76 is closed, the material passes to the chopper 72 and the length of travel of the residue flow 80 is substantially reduced by the impact or shear cutting principles of chopper blades 84 with the aid of counter knives if desired. The residue material then passes downward to the spreader 74, which has two counter-rotating impellers (although only one is shown in profile) and a crop divider between the impellers. The divider may be placed substantially close to the swept diameter of the chopper 72 to ensure the crop residue is divided and diverted to each impeller respectively. The spreader 74 may have adjustable deflectors that are selectively adjusted to alter the velocity imparted to the residue material to thereby control the distribution of the chopped residue on to the field. If the windrow selection door 76 is open (windrow mode), then the discharged straw or crop residue bypasses the chopper 72 and is discharged out of the machine onto a hood or chute that guides the residue material to form a windrow behind the machine 10. The spreader 74 receives a second stream of crop residue in the form of chaff from the cleaning shoe in a chaff flow 78 and incorporates this chaff residue in the spreader 74 with the chopped straw, so that all of the material, if the door 76 is closed, is spread behind the machine 10 in a uniform distribution. If the windrow door 76 is open, then the spreader 74 will spread only the chaff from the chaff flow 78.

It is contemplated that the chopper 72 may not include a front wrapper. It is further contemplated that the chopper 72 may include a front wrapper wall 86 to control any forward air movement, and the front wrapper around the chopper may partially enclose the chopper 72. Further, the wrapper wall 86 may be slotted 88 at the upper and front end such that the chopper blades 84 will pass through the slots 88 so that crop residue material discharged from the beater will not accumulate on the top of the wrapper 86 and cause a blockage to form. The wrapper 86 may enclose the chopper 72 from 90° to 180° starting at bottom dead center.

Figure 4A:
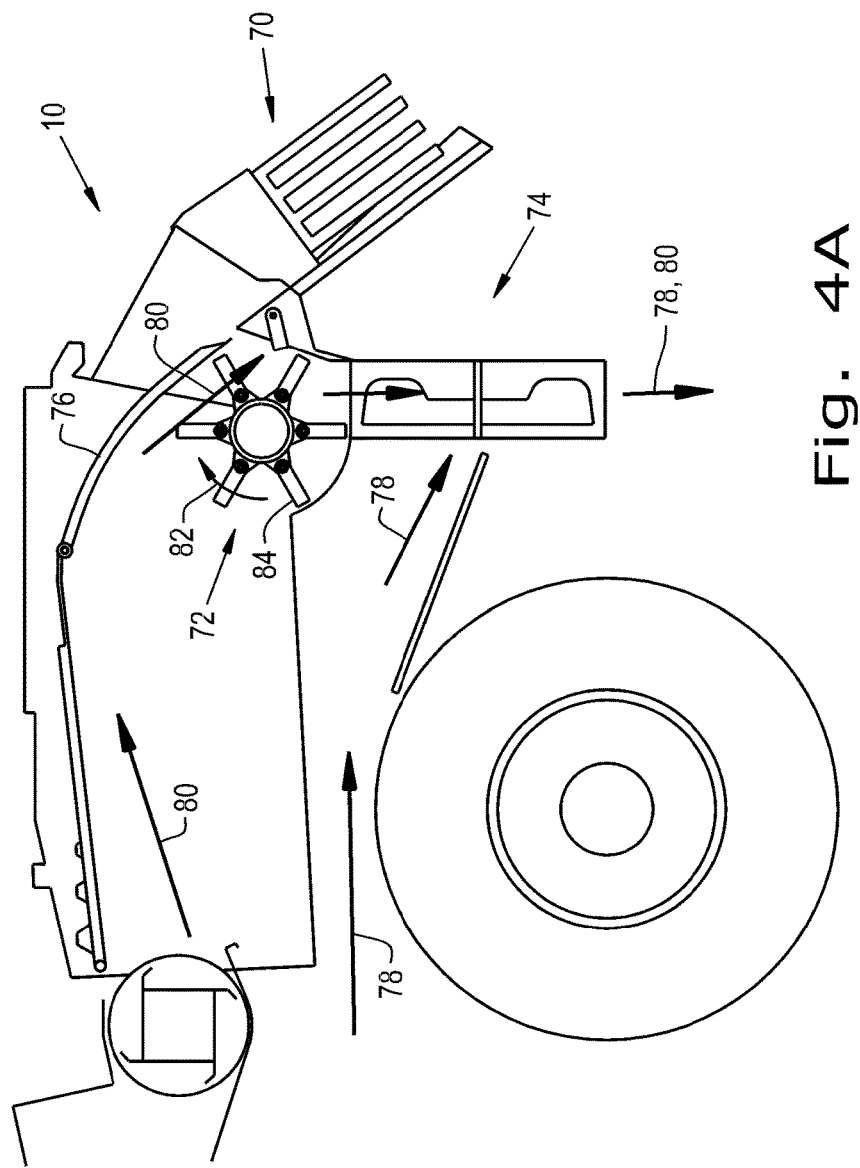
FIG. 4A is a side cutaway view of the residue handling system of FIGS. 1-3 in a chopping mode.
Figure 4B:
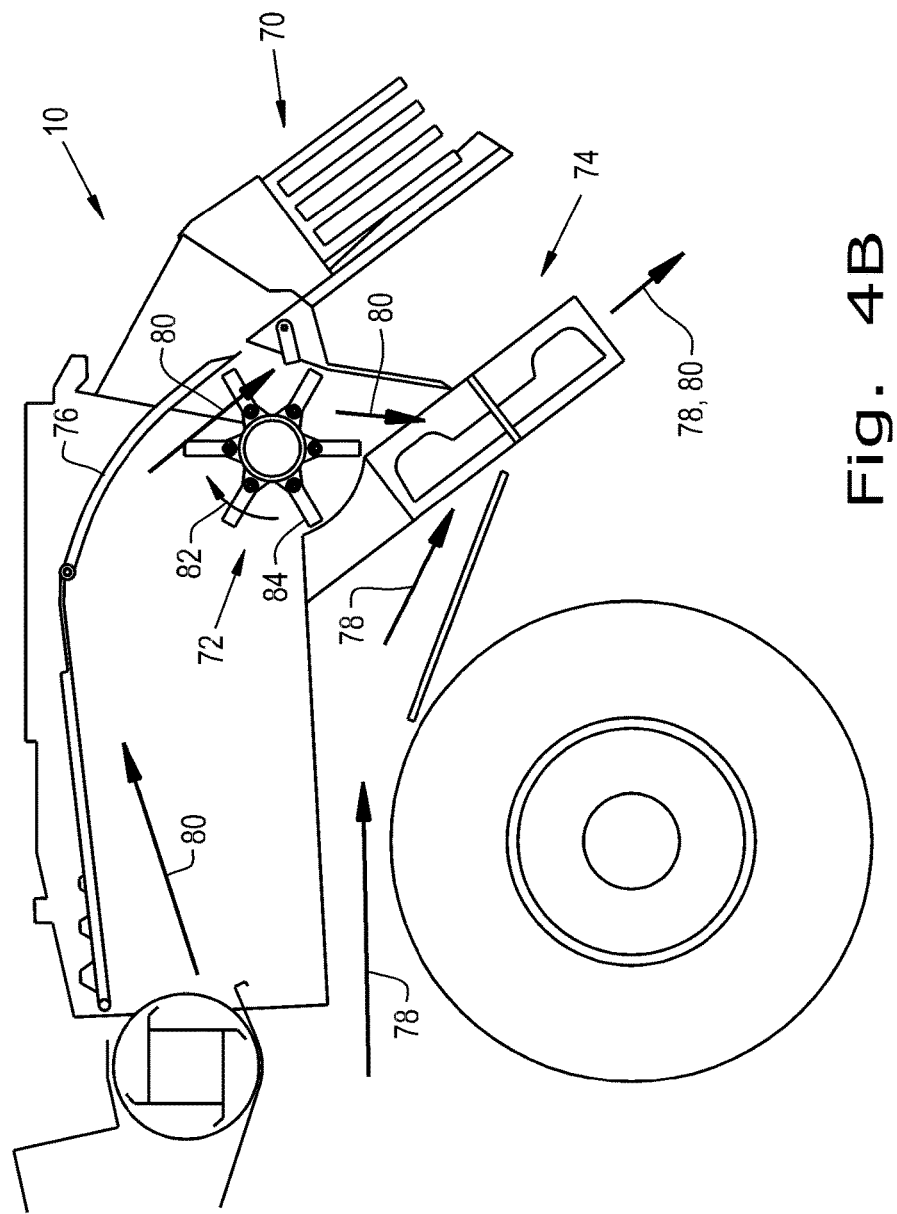
FIG. 4B is a side cutaway view of another embodiment of the residue handling system of FIGS. 1-3 in a chopping mode.
Figure 5:
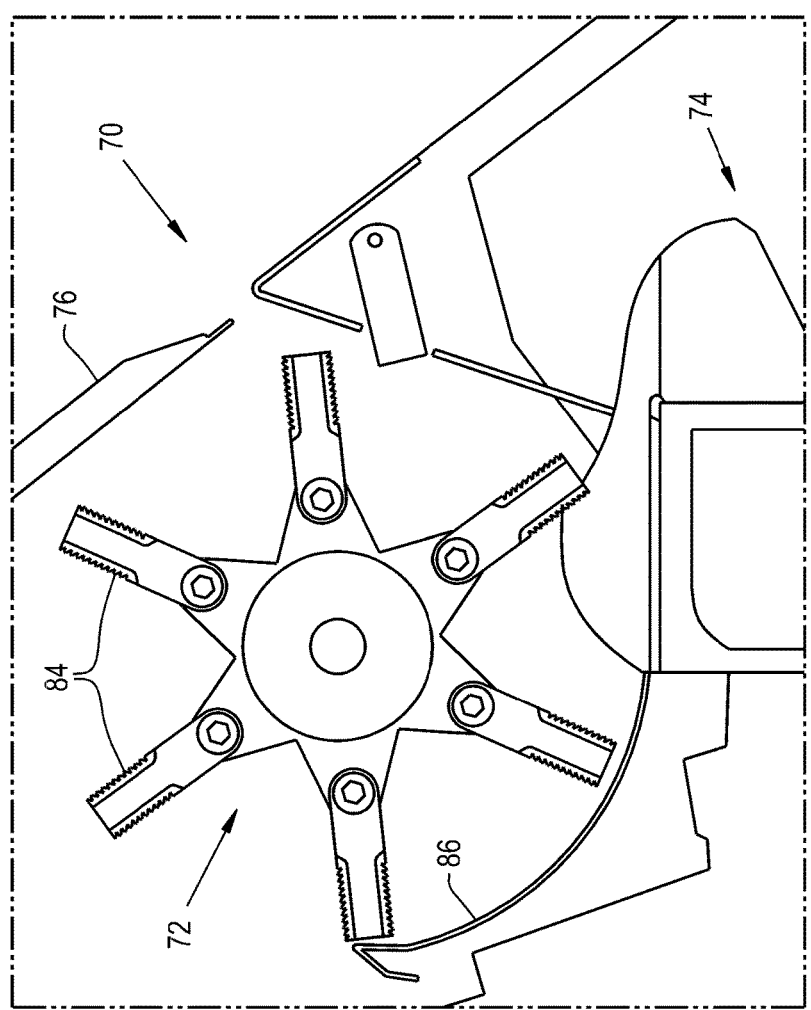
FIG. 5 is a closer side view, particularly of the residue chopper of the residue handling system of FIGS. 1-4.
Figure 6:
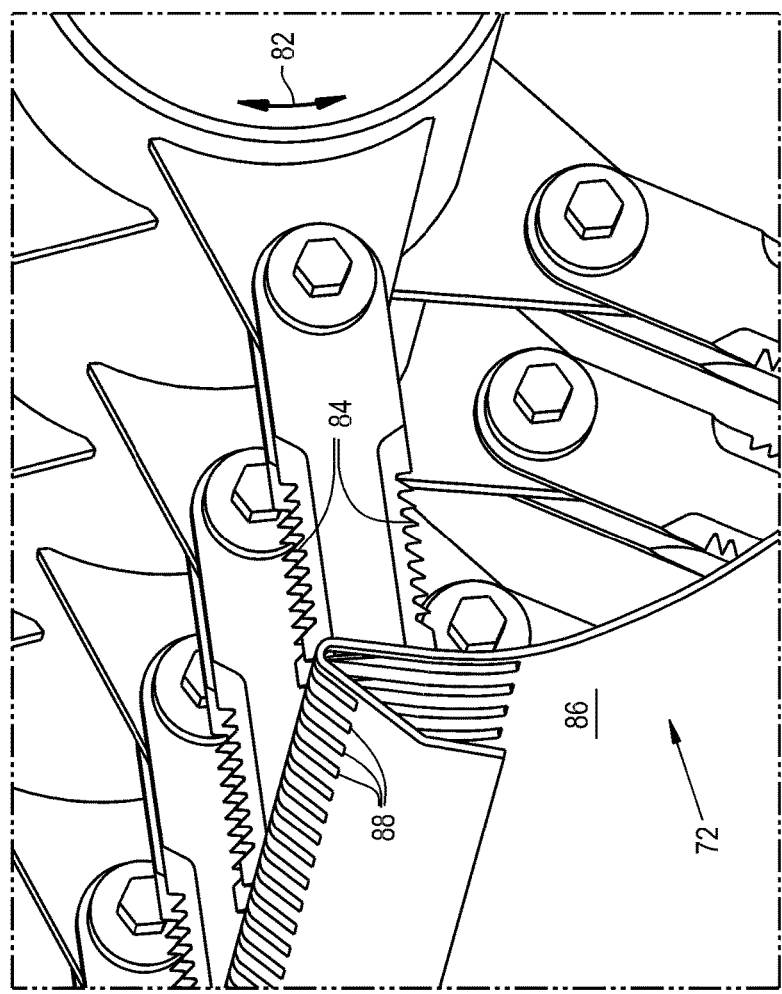
FIG. 6 is an even closer perspective view showing details of the chopper blades and part of the chopper wall, also illustrating that the residue chopper is operable in different directions.

The spreader 74 may pivot about a transverse axis between a substantially vertical position (+/−20°) and a rearward storage or service position. The spreader 74 may be driven by either a fluid power or mechanical drive system. The spreader 74 pivot axis is concentric to the chopper 72 axis, or the spreader 74 pivot axis may be rearward of the chopper 72 axis. The spreader 74 pivot axis can be concentric with the windrow hood pivot axis. The spreader 74 is biased to move to the storage position by a spring, gas strut, actuator or the like. The windrow hood or chute may or may not be attached to the spreader 74. If it is attached to the spreader 74, then it will rotate with the spreader 74. If it is not attached to the spreader 74, then the rotation of the spreader 74 may be limited by the position of the windrow hood. A corresponding latch position may be provided to hold the position of the hood and/or the spreader 74. As can be seen in FIG. 4A residue stream 80 is directed through chopper 72 and the chopped material enters an end of spreader 74, while residue stream 78 enters a back face of spreader 74 with the streams being mixed and combined into a single flows exiting as shown. In another embodiment of residue handling system 70, as shown in FIG. 4B, residue stream 80, after being chopped in chopper 72 proceeds into a face of spreader 74, while residue stream 78 enters an opposite face of spreader 74 and the mixed/combined residue streams exit as shown. Spreader 74 may be positioned at approximately 25° from vertical.

The chopper 72 may be driven by either a fluid power system or a mechanical drive system. The chopper 72 has 2 speeds: a low speed=800-1200 RPM and a high speed=2800-3500 RPM. The chopper 72 may be shifted between the two speeds remotely or from the cab 22. The windrow door 76 may be pivoted by a mechanical linkage, fluid power system, or an electric actuator. The pivotal movement may be accomplished by the operator from either the cab 22, a remote location on the machine 10, or within proximity of the door 76 by way of a linkage.

The residue chopper 72 is configured to operate at a tangential velocity 82 approximately equal to the velocity of the residue flow 80 passing above the residue chopper 72, in order to accommodate the material contained in the residue flow 80 or the velocity may vary therefrom to some degree to enhance the residue flow 80. The door 76 is positioned generally above the residue chopper 72, and the door 76 is pivotally movable between the raised windrow mode and the lowered chopping mode. As discussed above the residue chopper 72 has various operating speeds, the low speed may be used when the door 76 is in the windrow mode and the high speed is used when the door 76 is in the chopping mode.

The chaff flow 78 goes to the residue spreader 74 regardless of the position of the door 76. The residue flow 80 is directed to the residue chopper 72 and then to the residue spreader 74 when the door 76 is in the chopping mode. When the door 76 is in the raised windrow mode the residue flow 80 is directed generally above and toward the residue chopper 72. The residue chopper 72 has a direction of rotation 82 in which the bottom of the residue chopper 72 has a circumferential direction that is generally the same as the direction of travel 90 of the harvester 10. It is also contemplated that the blades 84 of the residue chopper 72 may run in an opposite direction when in the chopping mode.

Figure 7:
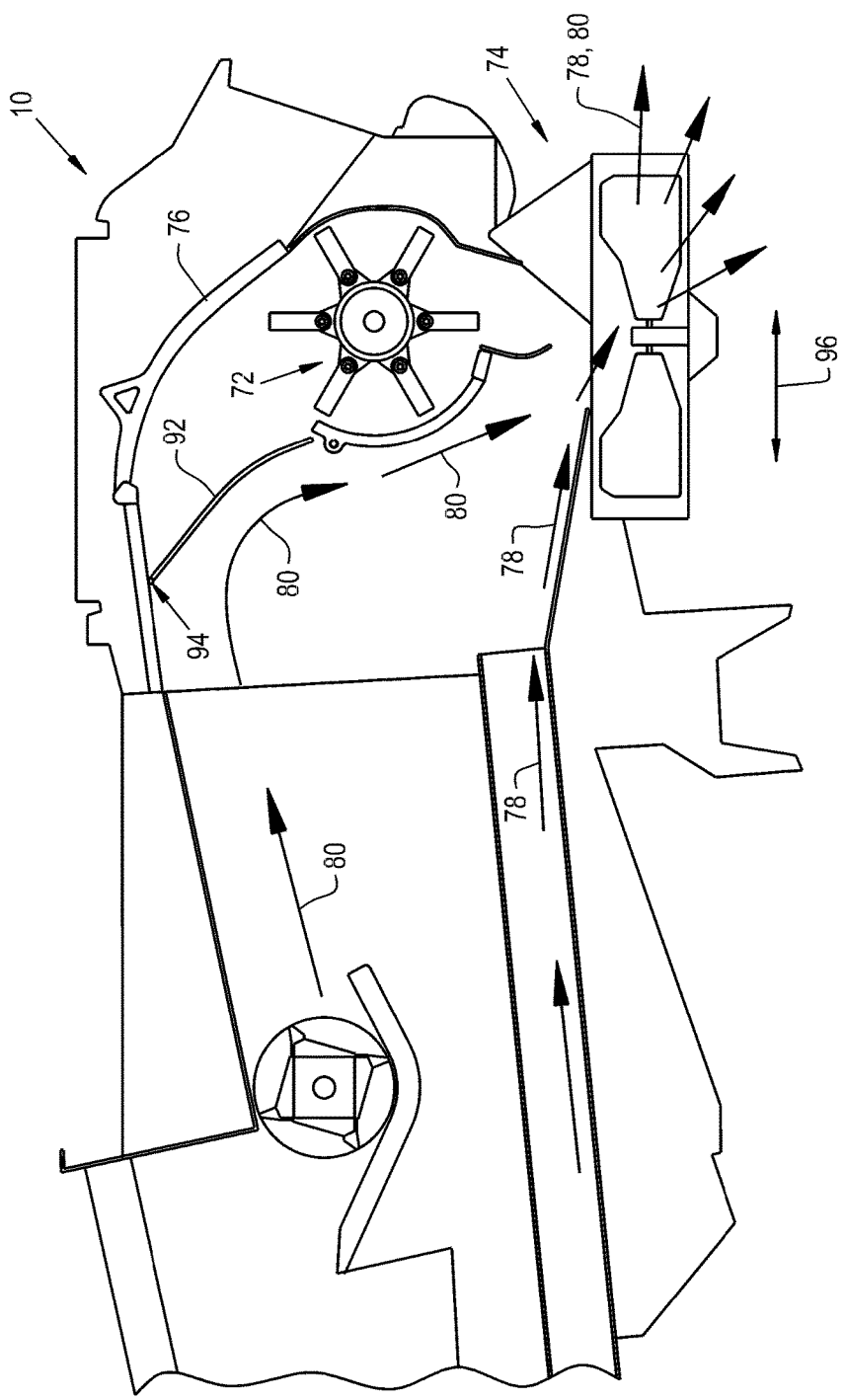
FIG. 7 is a side cutaway view of another embodiment of the present invention, used in the agricultural harvester of FIG. 1, having a deflector pivotally arranged before the door, with a horizontally arranged spreader.
Figure 8:
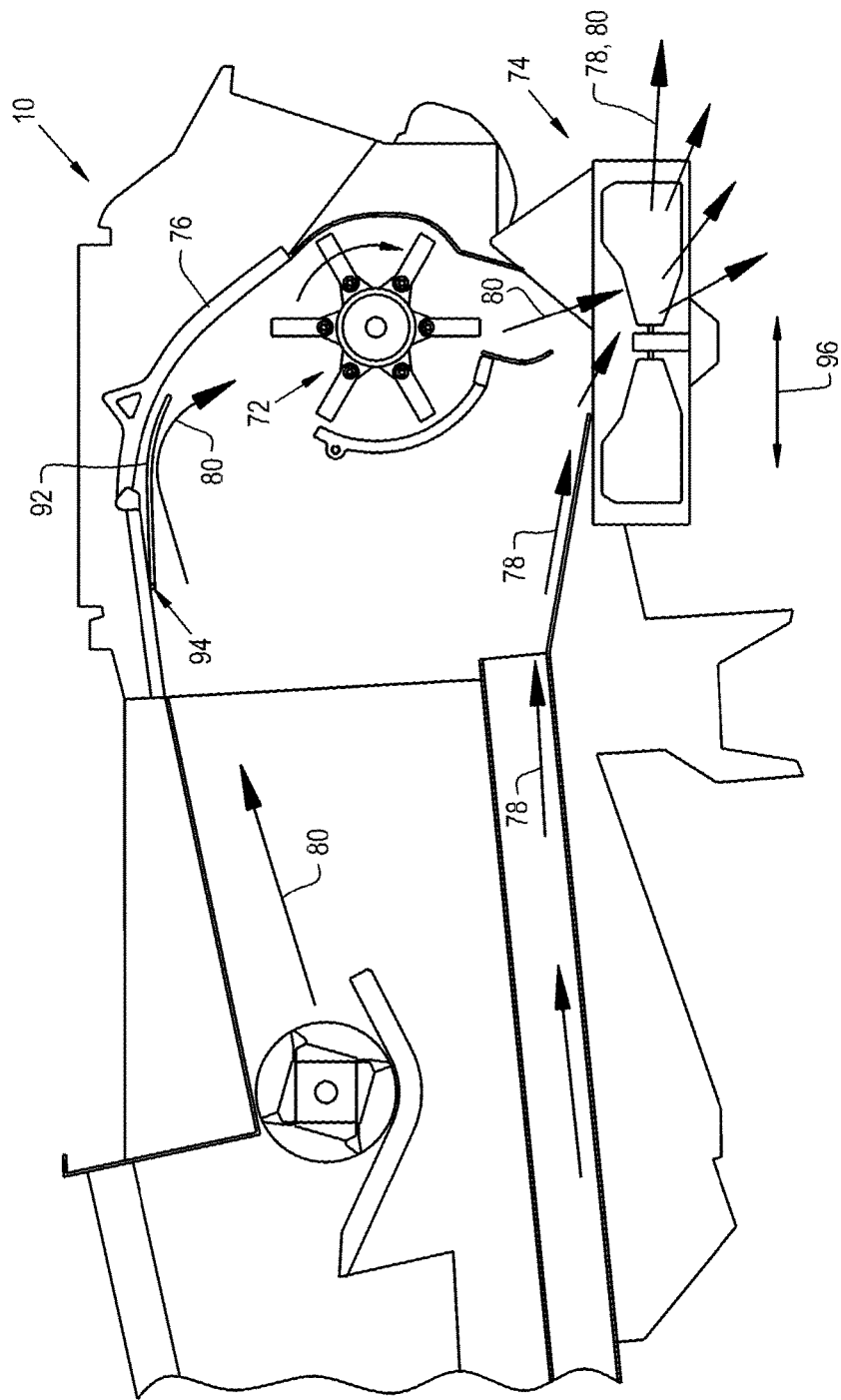
FIG. 8 is another view of the deflector of FIG. 7 in an alternate position.

Now additionally referring to FIGS. 7 and 8 there is illustrated another embodiment of the present invention, where the spreader 74 is installed generally horizontally plus or minus approximately 15° and is directly beneath the chopper 72. Upstream in the residue flow 80 there is a deflector 92 having a pivotal connection 94 that is positioned ahead of the door 76. The deflector 92 is positioned in a bypass configuration as shown in FIG. 7, where the residue flow 80 is deflected so as to bypass the chopper 72 and enter the spreader 74 along with the chaff flow 78 for distribution upon the field. When the deflector 92 is in the bypass position the chopper 72 may not be driven.

In FIG. 8 the deflector 92 is pivoted upwardly about the pivotal connection 94 and may be against and generally parallel to the door 76. In this position the deflector 92 is in a non-bypass configuration allowing the residue flow 80 to enter the top of the chopper 72 and the chopped residue then proceeds to the spreader 74 where it is joined with the chaff flow 78 and is distributed to the ground by the action of the spreader 74. Of course the position of the door 76, as discussed above, will also determine the path of the residue flow 80 when the deflector 92 is in the non-bypass position.

Figure 9:
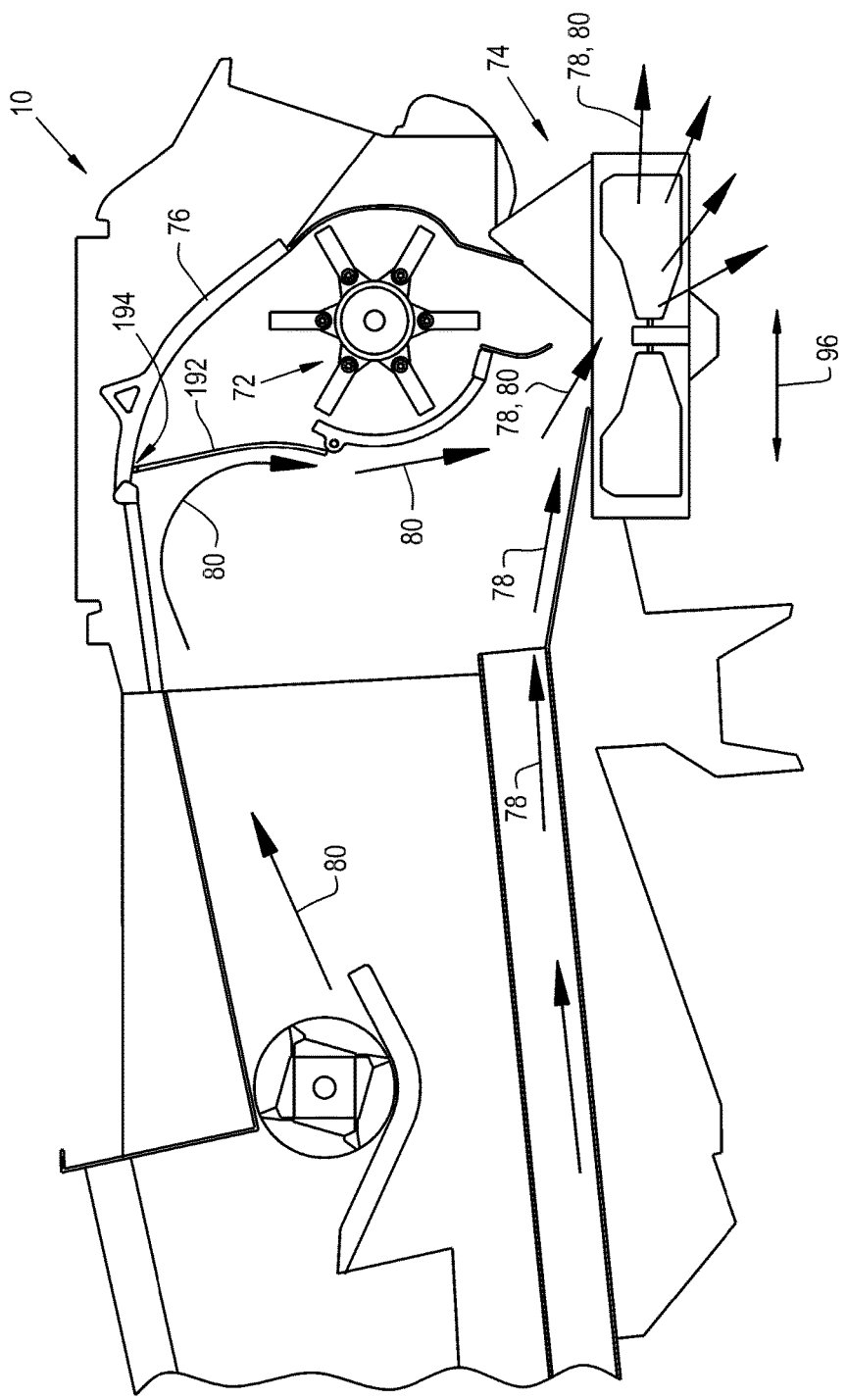
FIG. 9 is a side cutaway view of yet another embodiment of the present invention, used in the agricultural harvester of FIG. 1, having a deflector pivotally coupled to the door.
Figure 10:
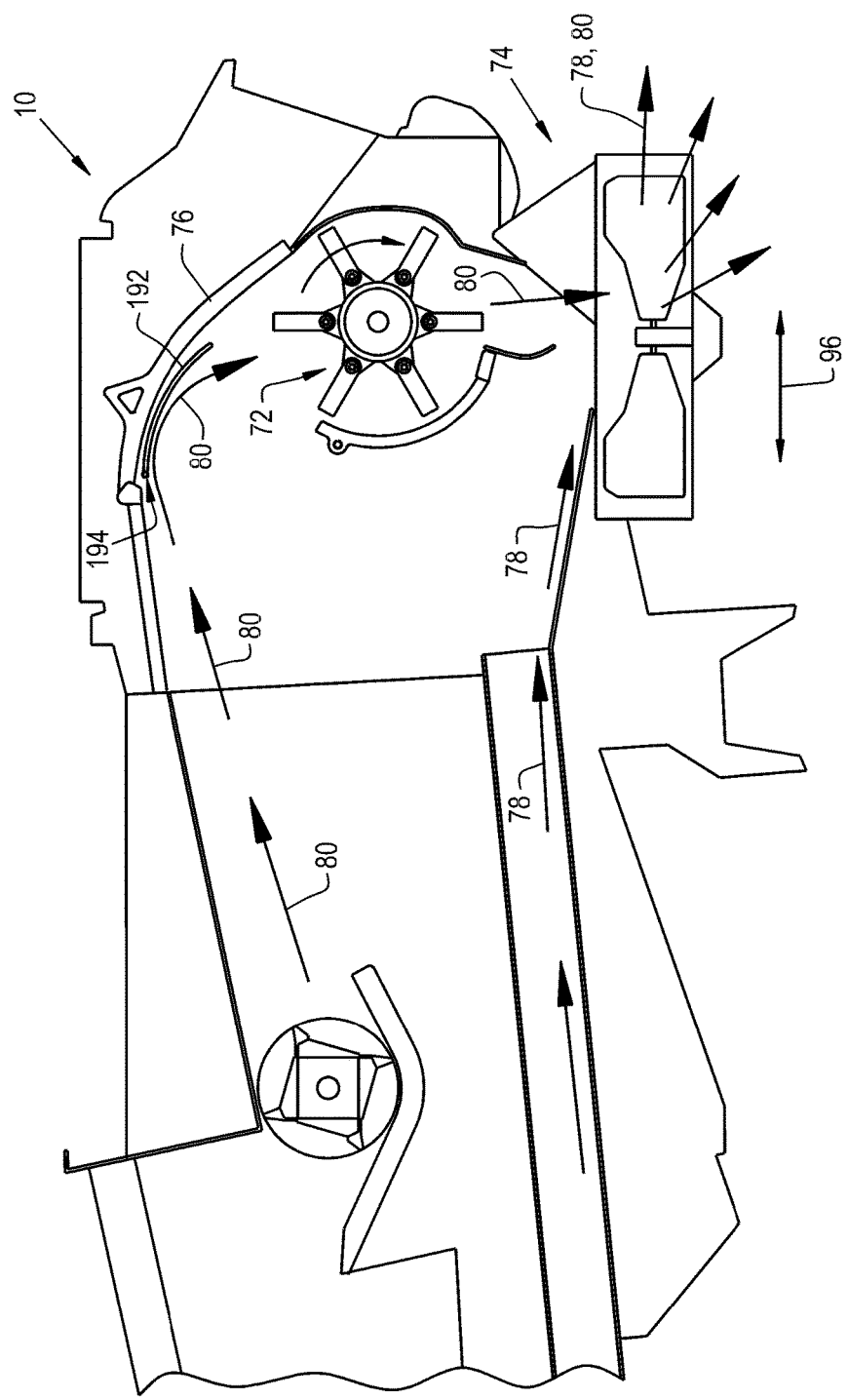
FIG. 10 is another view of the deflector of FIG. 9 in an alternate position.

Now additionally referring to FIGS. 9 and 10 there is illustrated yet another embodiment of the present invention, where, like the previous embodiment, the spreader 74 is installed generally horizontally plus or minus approximately 15° and is directly beneath the chopper 72. Upstream in the residue flow 80 there is a deflector 192 having a pivotal connection 194 that is positioned on the door 76 or may be co-pivotal with the door 76. The deflector 192 is positioned in a bypass configuration as shown in FIG. 9, where the residue flow 80 is deflected so as to bypass the chopper 72 and enter the spreader 74 along with the chaff flow 78 for distribution upon the field.

In FIG. 10 the deflector 192 is pivoted upwardly about the pivotal connection 194 and may be against and generally parallel to the door 76. In this position the deflector 192 is in a non-bypass configuration allowing the residue flow 80 to enter the top of the chopper 72 and the chopped residue then proceeds to the spreader 74 where it is joined with the chaff flow 78 and is distributed to the ground by the action of the spreader 74. Of course the position of the door 76, as discussed above, will also determine the path of the residue flow 80 when the deflector 192 is in the non-bypass position.

Figure 11:
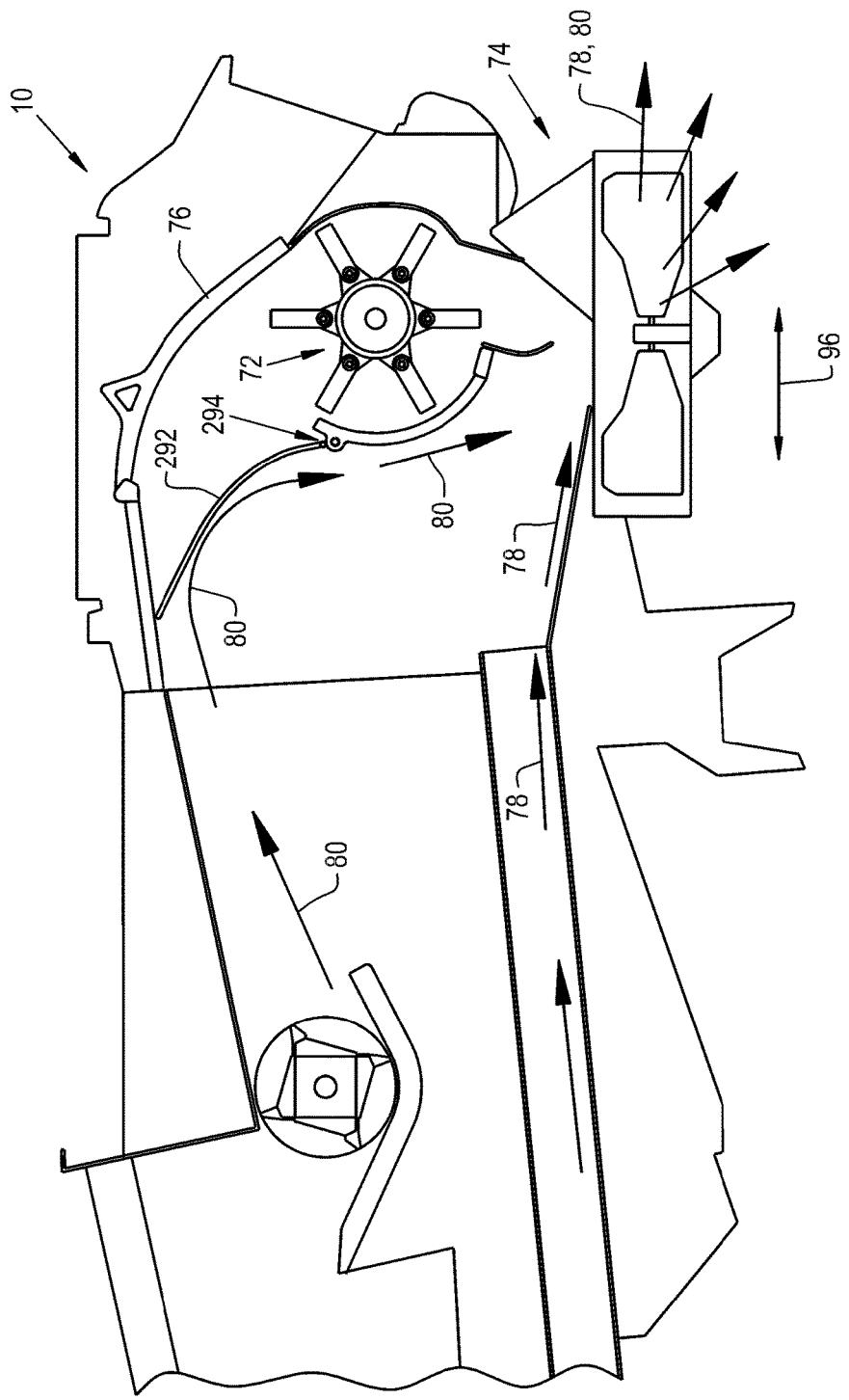
FIG. 11 is a side cutaway view of still yet another embodiment of the present invention, used in the agricultural harvester of FIG. 1, having a deflector pivotally coupled to a portion of the chopper housing.
Figure 12:
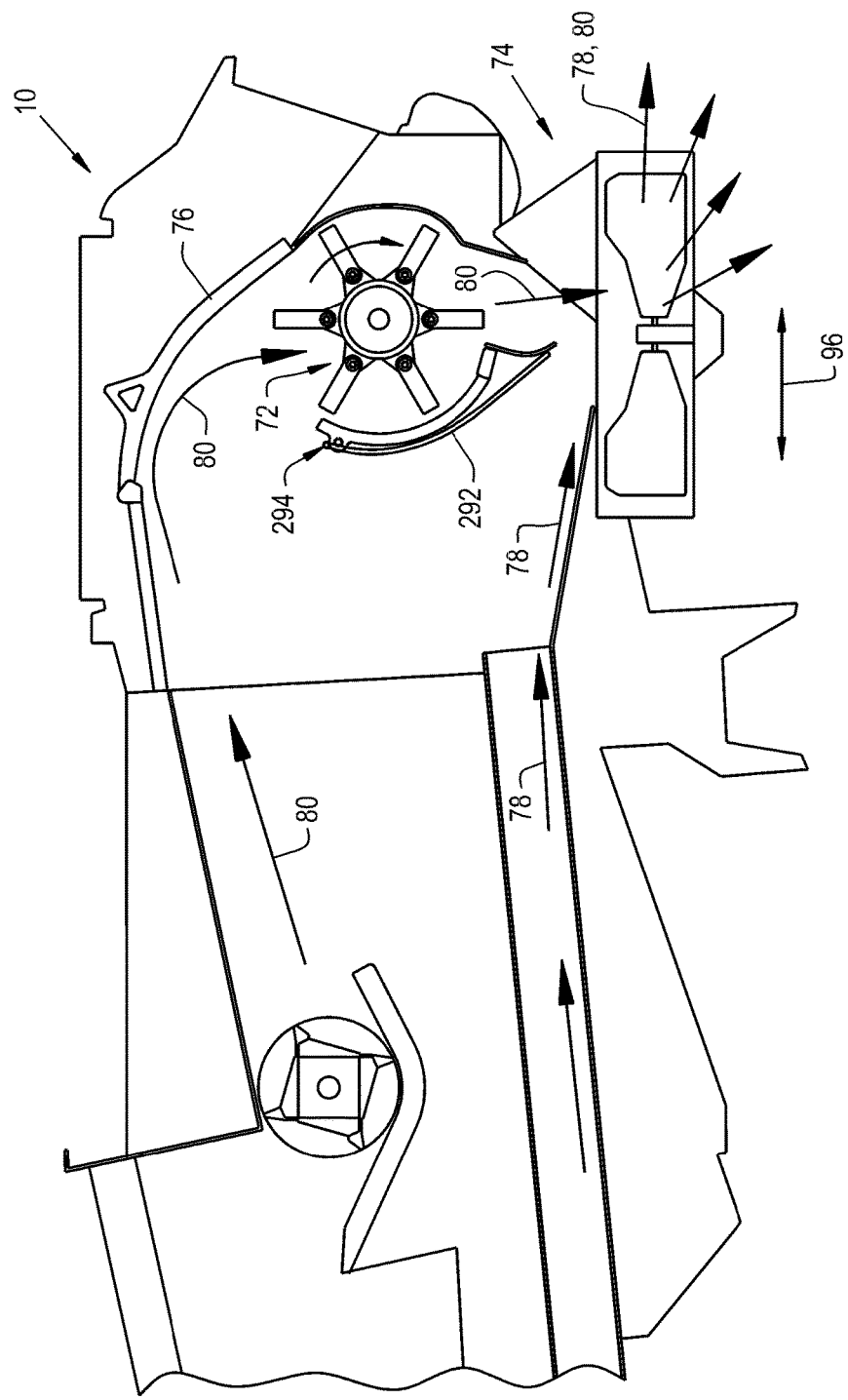
FIG. 12 is another view of the deflector of FIG. 11 in an alternate position.

Now additionally referring to FIGS. 11 and 12 there is illustrated still yet another embodiment of the present invention, where again the spreader 74 is installed generally horizontally plus or minus approximately 15° and is directly beneath the chopper 72. Upstream in the residue flow 80 there is a deflector 292 having a pivotal connection 294 that coupled to the housing of the chopper 72. The deflector 292 is positioned in a bypass configuration as shown in FIG. 11, where the residue flow 80 is deflected so as to bypass the chopper 72 and enter the spreader 74 along with the chaff flow 78 for distribution upon the field.

In FIG. 12 the deflector 292 is pivoted downwardly about the pivotal connection 294 and may be against and generally parallel to the housing of the chopper 72. In this position the deflector 292 is in a non-bypass configuration allowing the residue flow 80 to enter the top of the chopper 72 and the chopped residue then proceeds to the spreader 74 where it is joined with the chaff flow 78 and is distributed to the ground by the action of the spreader 74. Of course the position of the door 76, as discussed above, will also determine the path of the residue flow 80 when the deflector 292 is in the non-bypass position.

The spreader 74 may be pivoted to change the angle at which the residue flow 80 enters the spreader 74. Also, the spreader 74 may be movable in a direction 96, depending upon the mode in which the residue handling system 70 is in, to enhance the entry of the residue flow 80 into the spreader 74 and the ultimate distribution of the residue.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural harvester, comprising:
a chassis;
a separating system carried by said chassis, said separating system receiving a flow of crop material and producing a chaff flow and a residue flow; and
a residue handling system carried by said chassis for receiving the chaff flow and the residue flow from said separating system, said residue handling system includes a residue chopper and a residue spreader, said residue handling system having a chopping mode and a windrow mode, the residue flow being presented to and chopped by said residue chopper in said chopping mode, said residue chopper being operationally positioned above said residue spreader, said residue spreader being oriented such that at least a majority of an impeller of the spreader is located within a downward profile of the residue chopper to receive the chaff flow and the residue flow chopped by said residue chopper through a material flow path between the chopper and spreader, when said residue handling system is in said windrow mode the residue flow is allowed to bypass said residue chopper, said residue chopper being configured to operate in the windrow mode at a tangential velocity approximately equal to a velocity of the residue flow that passes over said residue chopper thereby accommodating the residue flow to form a windrow.

2. The agricultural harvester of claim 1, wherein said residue chopper is configured to operate at a velocity equal to a velocity of the flow of the residue passing above said residue chopper.

3. The agricultural harvester of claim 1, wherein said residue handling system further includes a door positioned above said residue chopper, said door being configured to divert the residue flow to said residue chopper when said residue handling system is in the chopping mode and to not divert the residue flow when in the windrow mode.

4. The agricultural harvester of claim 3, wherein said door is pivotally movable between the windrow mode and the chopping mode.

5. The agricultural harvester of claim 4, wherein said residue chopper has a first operating speed when said door is in the windrow mode and a second operating speed when said door is in the chopping mode, said second operating speed being greater than said first operating speed.

6. The agricultural harvester of claim 5, wherein said first operating speed is in a range of 800 to 1,200 RPM, said second operating speed being in a range of 2,800 to 3,500 RPM.

7. The agricultural harvester of claim 4, wherein said residue handling system is configured to direct the chaff flow to said residue spreader whether said door is in said windrow mode or said chopping mode.

8. The agricultural harvester of claim 7, wherein said residue handling system is configured to direct the residue flow from said separating system above and toward said residue chopper when said door is in said windrow mode.

9. The agricultural harvester of claim 8, wherein said residue chopper includes a chopper front wall having slots therein and said residue chopper additionally includes blades, at least some of said slots accommodating a travel of at least one of said blades therethrough.

10. The agricultural harvester of claim 1, wherein the agricultural harvester has a harvesting direction of travel, said residue chopper having a direction of rotation in which a bottom of said residue chopper has a circumferential direction that is generally the same as said direction of travel.

11. The agricultural harvester of claim 10, wherein said residue handling system is configured so that the residue flow from said residue chopper enters a first face of said residue spreader and the chaff flow enters an opposite face of said residue spreader.

12. A residue handling system for use in an agricultural harvester having a separating system, the residue handling system comprising:
   a residue chopper; and
   a residue spreader, the residue handling system being configured to receive a chaff flow and a residue flow from the separating system, said residue chopper being configured to operate in a chopping mode and a windrow mode to process the residue flow presented thereto, the residue chopper being operationally positioned directly above said residue spreader such that at least a majority of an impeller of the spreader is located within a downward profile of the residue chopper, said residue spreader being oriented to receive the chaff flow and the residue flow chopped by said residue chopper through a material flow path between the residue chopper and spreader, when said residue chopper is in said windrow mode the residue flow is allowed to bypass said residue chopper by traveling above said residue chopper with the chaff flow still being directed to said residue spreader, said residue chopper being configured to operate in the windrow mode at a tangential velocity approximately equal to a velocity of the residue flow passing over said residue chopper hereby accommodating the residue flow to form a windrow.

13. The residue handling system of claim 12, wherein said residue chopper is configured to operate at a velocity equal to a velocity of the flow of the residue passing above said residue chopper.

14. The residue handling system of claim 13, further comprising a door positioned generally above said residue chopper, said door being configured to divert the residue flow to said residue chopper when in the chopping mode and to not divert the residue flow when in the windrow mode.

15. The residue handling system of claim 14, wherein said residue chopper has a first operating speed when the door is in the windrow mode and a second operating speed when the door is in the chopping mode, the second operating speed being greater than the first operating speed, said first operating speed being in a range of 800 to 1,200 RPM, said second operating speed being in a range of 2,800 to 3,500 RPM.

16. The agricultural harvester of claim 1, wherein the axis of rotation of the residue chopper is directly above the residue spreader.

* * * * *